(12) United States Patent
Helkey

(10) Patent No.: US 6,441,932 B1
(45) Date of Patent: Aug. 27, 2002

(54) INTENSITY NOISE SUPPRESSION USING DIFFERENTIAL DELAY CANCELLATION IN EXTERNAL MODULATION LINKS

(75) Inventor: Roger Helkey, Chelmsford, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/247,789

(22) Filed: Feb. 9, 1999

(51) Int. Cl.$^7$ ............................................... H04B 10/08
(52) U.S. Cl. ..................... 359/110; 359/110; 359/111; 359/112; 359/140; 359/156; 385/11; 385/15; 385/39; 385/140
(58) Field of Search ................................ 359/110, 111, 359/112, 156, 140; 385/11, 15, 39, 140

(56) References Cited

U.S. PATENT DOCUMENTS

| | | | |
|---|---|---|---|
| 5,522,004 A | * 5/1996 | Djupsjobacka et al. | ...... 385/123 |
| 5,894,531 A | * 4/1999 | Alcoz | .......................... 385/11 |
| 5,963,352 A | * 10/1999 | Atlas et al. | .................. 359/161 |
| 6,091,864 A | * 7/2000 | Hofmeister | .................... 385/2 |

\* cited by examiner

*Primary Examiner*—Jason Chan
*Assistant Examiner*—Dzung Tran
(74) *Attorney, Agent, or Firm*—William G. Auton

(57) ABSTRACT

A technique and system of intensity noise suppression is disclosed using *delayed differential noise cancellation*, which can be applied to external modulation links. This technique is particularly suited to external modulation links using semiconductor diode laser sources, but is not limited to this type of laser. Laser sources also can be followed with an optical amplifier to increase the optical power, which also adds intensity noise. In this noise cancellation method, the intensity noise can be generated by the laser or the optical amplifier, or a combination of both. A bandpass differential method is disclosed which cancels optical intensity noise like the conventional differential method but operates only over a narrow RF bandwidth. Here the two complementary output signals of the modulator are subtracted by delaying one output by half of the modulation period (180° or an odd multiple thereof) and then summing the optical signals. The preferred implementation of summing the optical signals is in a polarization coupler, which for an ideal coupler introduces no insertion loss. Actual fiber couplers can have less than 0.5 dB of optical insertion loss. Although this noise cancellation method works only over a narrow RF band, it uses only one single-mode output fiber from the output of the summing network to the photodetector.

4 Claims, 4 Drawing Sheets

PRIOR ART

PRIOR ART

INTENSITY NOISE SUPPRESSION USING DIFFERENTIAL DELAY CANCELLATION IN EXTERNAL MODULATION LINKS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to noise suppression systems, and more specifically the invention pertains to a delayed differential noise cancellation system.

It has been recognized for some time that excess noise (i.e. noise above the shot noise level), spurious modulation and power drift in the laser can significantly reduce the accuracy of many measurements of laser light. In gas lasers, the noise levels can easily reach 50 dB above shot noise even at relatively high frequencies.

Shot noise is a random current fluctuation that occurs when light is detected. Conventional photodetectors, such as PIN diodes, pass current from their anode to their cathode in proportion to the number of photons that strike the detector. Shot noise results from the random arrival of photons, which can be modeled as a Poisson process. This random arrival time causes an electric current with an average value and a standard deviation in any given time interval. Excess noise represents current fluctuations larger than expected from this standard deviation, resulting from photons that do not arrive randomly. A method of reducing noise is to take a sample of the output beam and apply negative feedback to the laser operating current or to an external optical attenuator to keep the photocurrent, derived from the sample beam, constant. These systems tend to be complicated or expensive and can, at best, bring the signal-to-noise ratio of the output beam up to the signal-to-shot-noise ratio of the sample beam. Since, in these systems, the sample beam is usually appreciably weaker that the output beam and, so contains relatively more shot-noise, this method may not provide acceptable levels of noise reduction. In addition, since these systems depend on feedback, the effective bandwidth of the noise-reduced beam is often relatively small.

The following patents, which are incorporated herein by reference, describe prior art noise suppression techniques:

U.S. Pat. No. 5,428,314, Jun. 27, 1995, Odd/even order distortion generator and distortion cancellation circuit; Van Cleave, Todd;

U.S. Pat. No. 5,239,401, Aug. 24, 1993, Optical modulator for cancellation of second-order intermodulation products in lightwave systems;

U.S. Pat. No. 5,227,857, Jul. 13, 1993, System for cancelling phase noise in an interferometric fiber optic sensor arrangement; and U.S. Pat. No. 5,134,276, Jul. 28, 1992, Noise cancelling circuitry for optical systems with signal dividing and combining means.

SUMMARY OF THE INVENTION

The present invention is a narrow band optical noise cancellation system. One embodiment of this system includes:

a continuous wave optical laser that generates an optical carrier signal which has a modulating period; an RF source of a radio frequency modulating signal; a modulator that outputs a first and second optical modulated signal by splitting the optical carrier signal into a first and second carrier signal and modulating them with the radio frequency modulating signal; a means for delaying the first optical modulated signal by an odd multiple of 180° degrees of the modulating period to output a delayed first optical modulated signal at a first power level; an optical attenuator that adjusts the second optical modulated signal so that it has a second power level that equals the first power level of the delayed first optical modulated signal from the delaying means to output thereby an output modulated optical signal; and a photodetector that acts as a means for converting the output modulated optical signal into a modulated electrical signal.

In the embodiment of the invention, the modulator includes: an optical splitter that splits the optical carrier signal into the first and second carrier signal, a phase shifter that modulates the relative phase of the first and second carrier signal with the radio frequency modulating signal, and an optical combiner that sums the first and second carrier signal and produces a first and second processed optical carrier signal.

Another embodiment of the invention is a narrowband optical noise cancellation system that includes:

a diode laser that acts as a means for generating an optical carrier signal which has a modulating period;

a first and second RF source of first and second radio frequency modulating signals;

a linearized modulator unit that modulates the optical carrier signal with the first and second radio frequency modulating signals to output thereby a first and second optical modulated signal;

a means for delaying the first optical modulated signal by an odd multiple of 180° degrees of the modulating period to produce a delayed first optical modulated signal; and a means for combining the delayed first optical modulated signal with the second optical modulated signal to output a combined optical modulated output signal.

In the embodiment, the linearized modulation unit includes:

an optical splitter that splits the optical carrier signal into a first and second optical carrier signal;

a first modulator which modulates the first and second optical carrier signal with the first radio frequency modulating signals to output a first and second processed optical carrier signal;

a second modulator which modulates the first and second processed optical carrier signal from the first modulating laser with the second radio frequency modulating signal to output thereby the first and second optical modulated signal.

It is an object of the invention to provide a noise cancellation system for use in an optical modulation system.

It is another object to provide a noise cancellation process for use with optical modulation systems.

These objects together with other objects, features and advantages of the invention will become more readily apparent from the following detailed description when taken in conjunction with the accompanying drawings wherein like elements are given like reference numerals throughout.

BRIEF DESCRIPTION OF THE DRAWINGS

FIG. 1a is a block diagram of a prior art optical modulation system;

FIG. 1b is a block diagram of a prior art optical noise cancellation system;

FIGS. 1c–2c are illustrations of the noise suppression system of the present inventions;

DETAILED DESCRIPTION OF THE PREFERRED EMBODIMENT

Relative intensity noise from diode lasers and optical amplifiers degrades performance of external modulation links. In external modulation links, the optical carrier is generated by a laser and modulated by an external device, such as an electrooptic crystal placed in an interferometer to convert phase modulation to amplitude modulation. Typically, an expensive Nd:YAG laser is used as the laser source due to its low intensity noise. A semiconductor diode laser is potentially the lowest-cost laser source for external modulation, but has much higher intensity noise that a Nd:YAG laser.

The present invention is a technique of intensity noise suppression, using delayed differential noise cancellation, which can be applied to external modulation links. This technique is particularly suited to external modulation links using semiconductor diode laser sources, but is not limited to this type of laser. The benefits of applying this technique to other laser types will be obvious to anyone skilled in the art. Laser sources also can be followed with an optical amplifier to increase the optical power, which also adds intensity noise. In this noise cancellation method, the intensity noise can be generated by the laser or the optical amplifier, or a combination of both.

Figure 1:
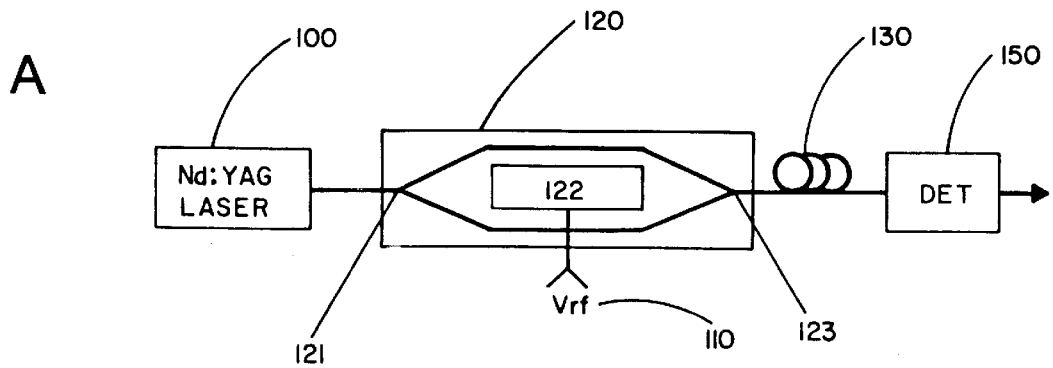
Figure 1:
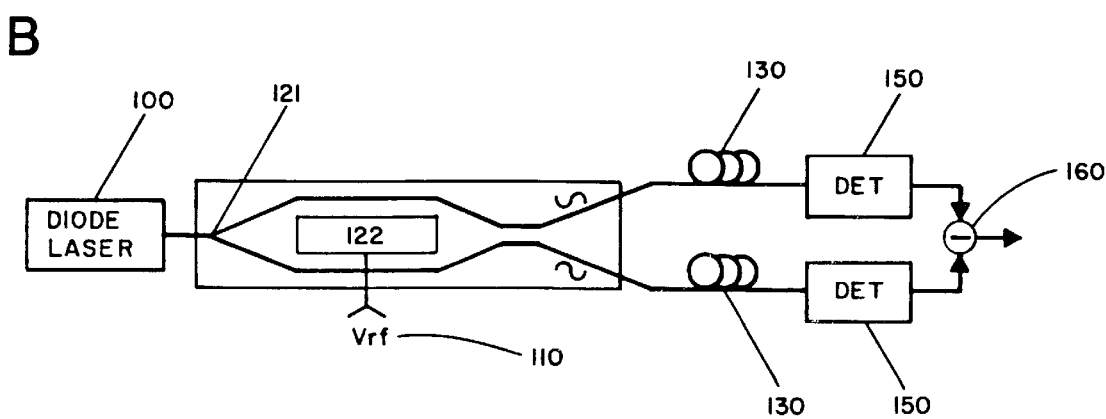
Figure 1:
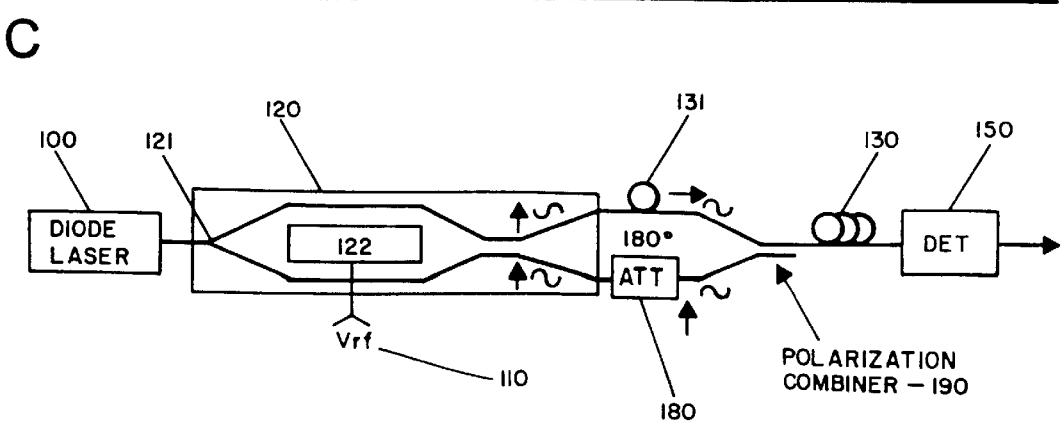

In a standard external modulation link shown in FIG. 1(a), a laser is used as a CW optical source and an intensity modulation signal is applied to the optical carrier by a Mach-Zehnder modulator with an electrooptic element. The electrooptic element provides a phase shift between the two optical paths, and the output coupler converts the phase shift to amplitude modulation. The signal is carried down an optical fiber and a photodetector is used to convert the optical intensity modulation back into an electrical signal.

For optical sources with high intensity noise, the conventional method of noise cancellation shown in FIG. 1(b) uses differential detection of two outputs of a complementary modulator with an equal-path delay. The two outputs from the Mach-Zehnder interferometer are out of phase, so subtracting them in a differential detector sums the signal component while canceling the common mode laser intensity noise. This method of noise suppression works over a broad bandwidth as long as the path length of each output is carefully matched, but length matching between fibers can be difficult when installing a link over a long distance (3). This difficulty of installation together with the cost of two fibers has made the broadband solution impractical for commercial systems.

A bandpass differential method shown in FIG. 1(c) is disclosed which cancels optical intensity noise like the conventional differential method, but operates only over a narrow RF bandwidth. Here the two complementary output signals of the modulator are subtracted by delaying one output by half of the modulation period (180° or an odd multiple thereof) and then summing the optical signals. The preferred implementation of summing the optical signals is in a polarization coupler, which for an ideal coupler introduces no insertion loss. Actual fiber couplers can have less that 0.5 dB of optical insertion loss. Although this noise cancellation method works only over a narrow RF band, it uses only one single-mode output fiber from the output of the summing network to the photodetector.

This RIN cancellation method requires equal optical power from both modulator outputs. The optical attenuator shown at one output of the modulator is optional. For some link parameters the optimum performance is achieved if this attenuator is not used and the modulator is biased for equal output power. If RIN is not perfectly cancelled by this circuit, the optimum bias can occur at a low modulator bias where the two outputs have unequal optical power. In this case, the modulator output with the higher optical power must be attenuated. The optical attenuation and the optical delay can be placed in either output of the modulator.

As depicted in FIG. 1(c), the present invention is a narrowband optical noise cancellation system. One embodiment of this system includes: a continuous wave optical laser 100 that generates an optical carrier signal; an RF source 110 of a radio frequency modulating signal; a modulator 120 that outputs a first and second optical modulated signal by splitting the optical carrier signal into a first and second carrier signal and phase modulates them with the radio frequency modulating signal; an optical combiner that sums the first and second phase modulated signals; a means 131 for delaying the first optical modulated signal by an odd multiple of 180° degrees of the modulating period to output a delayed first optical modulated signal at a first power level; an optional optical attenuator 180 that adjusts the second modulated signal so that it has a second power level that equals the first power level of the delayed first optical modulated signal; a polarization combiner 190 that acts as a means for combining the second optical modulated signal from the optical attenuator with the delayed first optical modulated signal from the delaying means to output thereby an output modulated optical signal; and a photodetector 150 that acts as a means for converting the output modulated optical signal into a modulated electrical signal. In FIGS. 1a and 1b, element 130 is the means for delaying the optical signal.

In this embodiment of the invention, the modulator unit 120 includes an optical splitter 121 that splits the optical carrier signal into the first and second carrier signal and a phase modulator 122 that modulates the first and second carrier signal with the radio frequency modulating signal.

Figure 2:
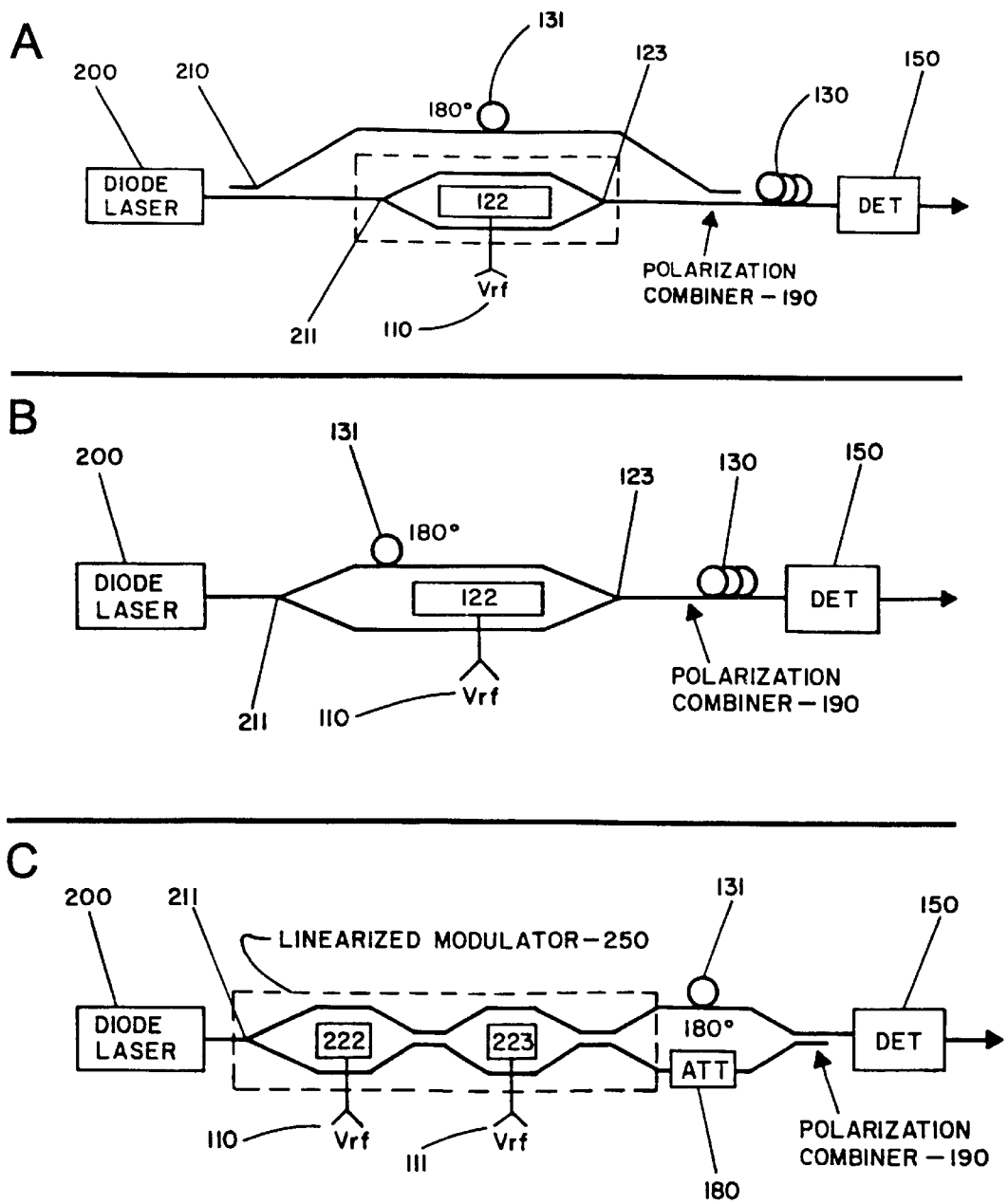

Another embodiment of the invention is as shown in FIG. 2(c), a narrowband optical noise cancellation system that includes:

- a diode laser 200 that acts as a means for generating an optical carrier signal;
- a first and second RF source 110, 111 of first and second radio frequency modulating signals;
- a linearized modulator unit 250 that modulates the optical carrier signal with the first and second radio frequency modulating signals to output thereby a first and second optical modulated signal;
- a means 131 for delaying the first optical modulated signal in multiples of 180° degrees of the modulating period to produce a delayed first optical modulated signal; and
- a means for combining 190 the delayed first optical modulated signal with the second optical modulated signal to output a combined optical modulated output signal.

In this embodiment, the linearized modulation unit includes:

an optical splitter 211 that splits the optical carrier signal into a first and second optical carrier signal;

a first modulator 222 which modulates the first and second optical carrier signal with the first radio frequency modulating signal to output a first and second processed optical carrier signal;

a second modulator 223 which modulates the first and second processed optical carrier signal from the first modulator with the second radio frequency modulating signal to output thereby the first and second optical modulated signal.

An alternative implementation is shown in FIG. 2a, which has the advantage of working with single-output Mach-Zehnder modulators. Here some of the original signal is tapped off before the modulator, and recombined with the modulator output after delaying one optical path by 180° or a multiple thereof This is not the preferred implementation, as it introduces an additional coupling loss which reduces the available optical power, and does not enhance the signal by using both modulator outputs. However, it has the advantage of working with all modulators, many of which do not provide complementary outputs.

This intensity noise cancellation method can also be implemented by putting the optical delay inside of the interferometer as shown in FIG. 2b. This is not the preferred implementation, as the long optical delay gives substantial optical frequency dependence to the modulator response, which converts frequency noise to amplitude noise. This implementation would be practical only for a system with high optical intensity noise and very low frequency noise.

Other modulator configurations can be used. Those configurations include linearized modulators such as the half-coupler modulator shown in FIG. 2c and directional coupler modulators. In general these configurations require an optical attenuator on one output, as typically the optimum bias point does not have equal output power from both ports.

For moderate bandwidth systems, performance of the delay line configuration is limited by phase imbalance at the band edges due to the frequency dependent phase of the delay line. The signal voltage gain $g_s$ is given by $$g_s = \left| 2\sin\left(\frac{\pi f}{2f_o}\right) \right| \quad (1)$$

were $f_0$ is the center frequency where the delay line phase shift is 180°. Then noise voltage gain is given by $$g_n = \left| 2\cos\left(\frac{\pi f}{2f_o}\right) \right| \quad (2)$$

A gain $g_{SNR}$ can be defined for the change in signal to noise ratio due to the RIN contribution.

$$g_{SNR} \equiv \frac{g_t}{g_n} = \left| \tan\left(\frac{\pi f}{2f_o}\right) \right| \quad (3)$$

An optical link was implemented with the configuration shown in FIG. 1b using a distributed feedback (DFB) diode laser and a $LiNbO_3$ dual output modulator with a $V_\pi$ of ~5 V at DC from UTP. The measured half-wave voltage $V_\pi$ of the modulator was 6.9 V at 4 GHz. The two outputs were combined in a polarization coupler with a fiber delay of 180° at an RF frequency of 4.01 GHz.

Figure 3:
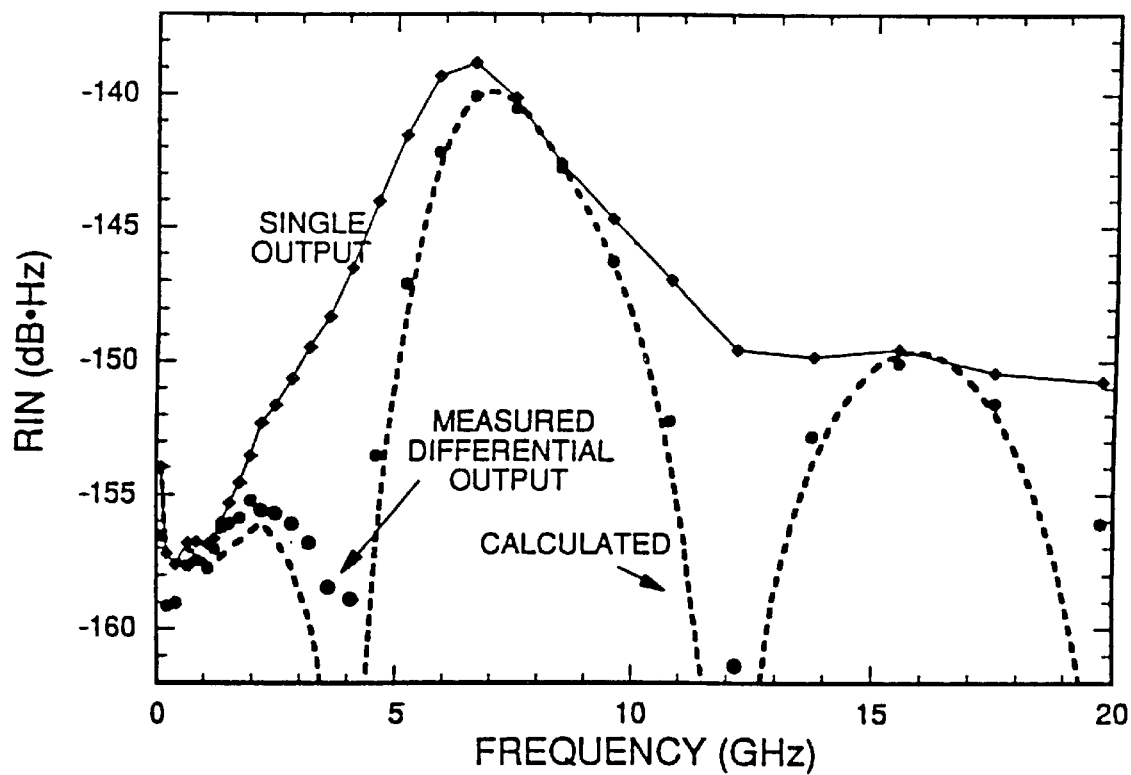
FIG. 3 is a chart of measured relative intensity noise as a function of frequency for the DFB laser with a fiber delay set for noise cancellation at 4 GHz for (a) measured single-output noise (b) measured delayed differential RIN (c) calculated delayed differential RIN.

The laser RIN shown in FIG. 3 was measured after the modulator by an HP70000 lightwave spectrum analyzer at a laser bias current of 117 mA. The RIN measured with a single modulator output is actual RIN of the laser. The RIN measured using the delayed differential configuration is modified by the bandpass noise cancellation effect discussed earlier. The expected differential configuration RIN calculated from the single-output RIN and the noise cancellation effect is also shown.

Figure 4:
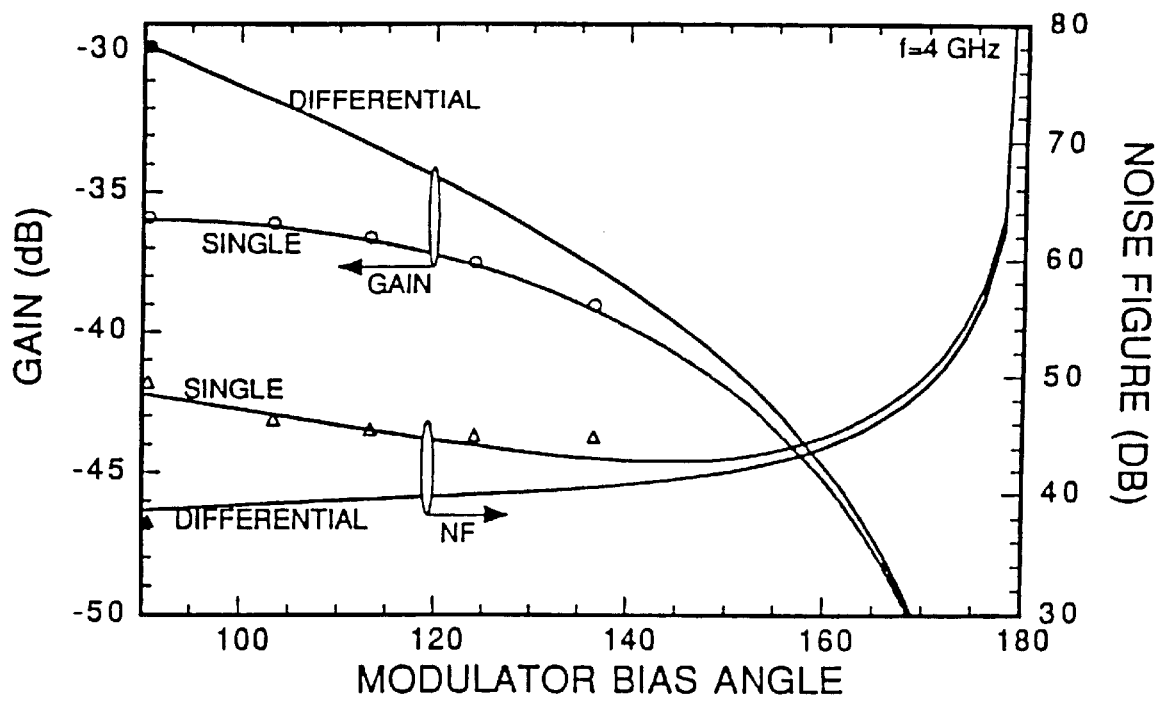
FIG. 4 is a chart of measured and calculated gain and noise figure for the single-ended and differential configurations at a GHz modulation frequency.

The theoretical response has infinite RIN suppression for perfect amplitude balance between the two modulator outputs. However, an experimental RIN suppression limit was observed. Here the largest measured RIN suppression for the differential output configuration is 12 dB, although up to 17 dB has been observed. This noise suppression limit is believed to be due to imperfect polarization isolation in the polarization coupler. Although the polarization combiner acts principally as an incoherent combiner, imperfect polarization isolation between the modulator outputs causes a second parasitic Mach-Zehnder interferometer. Because of the large delay in one arm of this interferometer, it acts as a highly sensitive converter of optical frequency modulation noise to amplitude modulation noise. The resulting link performance is shown in FIG. 4. The optimum noise figure is improved by about 6 dB using the differential configuration. The link gain is also substantially increased.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A narrowband optical noise cancellation system comprising:

a continuous wave optical laser that generates an optical carrier signal which has a modulating period;

an RF source of a radio frequency modulating signal;

a modulator that outputs a first and second optical modulated signal by splitting the optical carrier signal into a first and second carrier signal and modulating them with the radio frequency modulating signal;

a means for delaying the first optical modulated signal by an odd multiple of 180 degrees of the modulating period to output a delayed first optical modulated signal at a first power level;

an optical attenuator that adjusts the second optical modulated signal so that it has a second power level that equals the first power level of the delayed first optical modulated signal;

a means for combining the second optical modulated signal from the optical attenuator with the delayed first optical modulated signal from the delaying means to output thereby an output modulated optical signal; and a means for converting the output modulated optical signal into a modulated electrical signal.

2. A narrowband optical noise cancellation system, as defined in claim 1, wherein said combining means comprises a polarization combiner.

3. A narrowband optical noise cancellation system, as defined in claim 2, wherein said converting means comprises a photodector.

4. A narrowband optical noise cancellation system, as defined in claim 3, wherein said modulating diode laser unite comprises:

an optical splitter that splits the optical carrier signal into the first and second carrier signal and a modulator that modulates the first and second carrier signal with the radio frequency modulating signal.

* * * * *